United States Patent [19]

Takayama

[11] 3,856,047
[45] Dec. 24, 1974

[54] PRESSURE CONTROL VALVE
[75] Inventor: Katsuki Takayama, Chiryu, Japan
[73] Assignee: Aisin Seki Kabushiki Kaisha
[22] Filed: Nov. 30, 1972
[21] Appl. No.: 310,768

[30] Foreign Application Priority Data
Dec. 2, 1971 Japan.............................. 46-097424

[52] U.S. Cl........................ 137/625.61, 137/625.64
[51] Int. Cl......... F15b 5/00, F15c 3/02, F15d 3/00, F16k 11/07, F16k 11/32, G05d 16/00
[58] Field of Search....... 137/625.61, 625.6, 625.64, 137/625.66, 625.68, 625.63, 625.65; 251/28, 251/30, 46

[56] References Cited
UNITED STATES PATENTS

| | | | |
|---|---|---|---|
| 2,722,234 | 11/1955 | Macgeorge et al. | 137/625.6 |
| 3,012,575 | 12/1961 | Woody et al. | 137/625.62 |
| 3,113,590 | 12/1963 | Olson | 137/625.6 |
| 3,126,031 | 3/1964 | Hayner | 137/625.64 X |
| 3,223,104 | 12/1965 | Cox et al. | 137/625.62 X |
| 3,245,424 | 4/1966 | Olsen | 137/625.64 X |
| 3,433,266 | 3/1969 | Bidlack | 137/625.61 |
| 3,474,828 | 10/1969 | Wheeler et al. | 137/625.6 |
| 3,587,617 | 6/1971 | Olsen | 137/625.64 X |

Primary Examiner—Martin P. Schwadron
Assistant Examiner—Robert J. Miller
Attorney, Agent, or Firm—Oblon, Fisher, Spivak, McClelland & Maier

[57] ABSTRACT

A pressure control valve comprising a valve spool movably mounted within a valve housing for controlling the coupling between inlet and outlet ports, the valve spool defining first and second chambers within the housing, a first passage for supplying the input fluid pressure through a first orifice to the first chamber to urge the valve spool in one direction, a second passage for connecting the first chamber to an outlet port through a second orifice, a third passage for supplying the input fluid pressure through a third orifice to the second chamber to urge the valve spool in the other direction, a fourth passage connecting the second chamber to a reservoir through a nozzle controlled by a flapper valve whereby the valve spool acts so as to control the output fluid pressure in proportion to the size of the opening of the nozzle.

5 Claims, 1 Drawing Figure

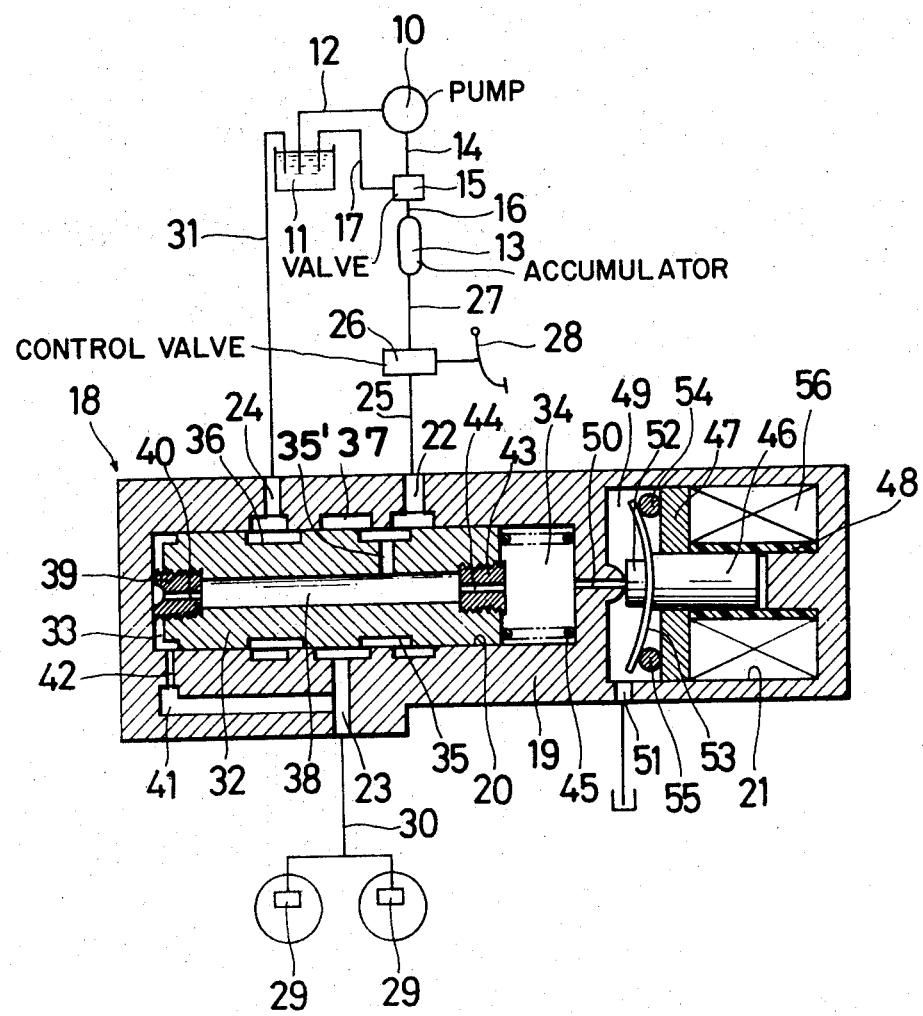

PRESSURE CONTROL VALVE

BACKGROUND OF THE INVENTION

This invention relates generally to a pressure control system for a vehicle and more particularly to an improved pressure control valve embodied therein for delivering a desired pressure.

Conventionally, various devices have been proposed to control the output fluid pressure of a vehicle pressure control system. Such devices comprise a slidable valve spool for controlling the fluid communication between inlet and outlet ports, and the outlet and drain ports. The valve spool has first and second areas to which the fluid pressures may be applied so as to balance and position the valve spool. The fluid pressure directly connected to the outlet port may be applied to the first area so as to urge the valve spool in a direction which will reduce the fluid communication between the inlet and outlet ports and increase the fluid communication between the outlet and drain ports, while the fluid pressure conveyed from the inlet port through an orifice may be applied to the second area so as to urge the valve spool in a direction which will increase the fluid communication between the inlet and outlet ports and reduce the fluid communication between the outlet and drain ports. The last mentioned fluid pressure leads to a reservoir through a variable orifice, such as a nozzle adapted to be controlled by a flapper valve. Thus the spool valve acts to control and vary the output fluid pressure in proportion to the size of the opening of the nozzle.

However, it should be noted that even when the nozzle is in its full open position the fluid pressure is retained between the orifice and the nozzle due to the flow resistance of the nozzle, the fluid pressure acting upon the second area. Accordingly, conventional devices require means, such as, for example, a spring or a reaction piston, for urging the valve spool in opposition to the fluid pressure retained between the orifice and the nozzle and thus the output fluid pressure will become zero when the nozzle is in its full opening position.

In use of the spring, however, the fluid pressure retained between the orifice and the nozzle is varied in proportion to the input fluid pressure while the force of the spring has no relation to the input fluid pressure. Therefore, such devices have the disadvantage in which the output fluid pressure is influenced by the force of the spring and upon closing of the nozzle no output fluid pressure is delivered until the fluid pressure generated between the orifice and the nozzle exceeds the force of the spring.

In use of the reaction piston, the disadvantage mentioned above will be substantially obviated, but such devices must be assembled with a high degree of accuracy which will result in high manufacturing costs.

In addition, in such conventional devices, the output pressure will be rapidly reduced when the coupling between the outlet port and the drain port is opened and the coupling between the inlet port and the outlet port is closed. This rapid reduction causes the output pressure to fluctuate. In order to prevent the fluctuation it is required to underlap the corresponding lands of the valve spool and the valve body or housing. Furthermore, taking into consideration the inherent manufacturing errors or tolerances, the underlap must be arranged so as to cover a wide area which thereby increases the amount of consumption of fluid pressure.

SUMMARY OF THE INVENTION

Therefore, it is an object of the present invention to provide an improved pressure control valve obviating the various drawbacks mentioned above.

It is another object of the present invention to provide an improved pressure control valve which is simple in construction and comparatively inexpensive.

It is a further object of the present invention to provide an improved pressure control valve wherein the control valve comprises means for connecting the inlet port to the outlet port through first and second orifices disposed in series, and a valve spool including a first area to which the fluid pressure generated between the first and second orifices may be applied and a second area to which the fluid pressure in proportion to the size of the opening of the nozzle may be applied.

BRIEF DESCRIPTION OF THE DRAWINGS

Various other objects, features and attendant advantages of the present invention will be more fully appreciated as the same becomes better understood from the following detailed description when considered in connection with the accompanying drawing wherein:

The drawing is a schematic view, with parts in cross-section, showing the preferred embodiment of a fluid pressure control system constructed according to the present invention.

DETAILED DESCRIPTION OF THE PREFERRED EMBODIMENT

Referring now to the drawing, a pump 10 driven by a vehicle engine is hydraulically connected to a reservoir 11 through a suction conduit 12 and is also hydraulically connected to an accumulator 13, for delivering fluid under pressure thereto, through a delivery conduit 14, an unloading valve 15 and another delivery conduit 16. The unloading valve 15 serves to return the fluid under pressure conveyed from the pump 10 to the reservoir 11 via a return conduit 17 when the fluid under pressure in the accumulator 13 reaches a predetermined value.

A pressure control valve assembly generally indicated by the reference character 18 includes a housing 19 provided with an axially extending small diameter bore 20 and an axially extending large diameter bore 21. The housing 19 is formed, respectively, with a radial inlet port 22, a radial outlet port 23 and a radial drain port 24 all of which open, respectively, in to the small diameter bore 20. The inlet port 22 leads to the accumulator 13 through a conduit 25, a control valve means 26 and another conduit 27, the control valve means 26 being acuated by means of a manually operated brake pedal 28 so that the fluid communication between the accumulator 13 and the inlet port 22 is controlled in an on-off mode. The outlet port 23 is similarly hydraulically connected to fluid actuating means, such as, for example, wheel cylinder means 29, via a conduit 30, and the drain port 24 is hydraulically connected to the reservoir 11 via a conduit 31.

A valve spool 32 is slidably mounted within the small diameter bore 20 to thereby define first and second hydraulic chambers 33 and 34 therein. The valve spool 32 is provided with a first peripheral annular groove 35 which communicates with the inlet port 22 and a second peripheral annular groove 36 which communicates with the drain port 24. A similar annular groove 37 is formed within the wall of housing 19 which defines bore 20 and is connected to the outlet port 23. The grooves 35 and 36 are adapted for cooperating with the groove 37 in response to the sliding movement of the valve spool 32. More particularly, as the valve spool 32 is moved toward the right as viewed in the drawing, the communication between the grooves 35 and 37, that is to say, the fluid communication between the inlet and outlet ports 22 and 23 will be reduced and the communication between the grooves 37 and 36, i.e., the fluid communication between the outlet and drain ports 23 and 24 will be increased.

An axial passage 38 formed within the valve spool 32 is connected to the peripheral groove 35 through a radial port 35', and thereby to the inlet port 22. The axial passage 38 connects the first and second chambers 33 and 34, respectively through a member 39 threadingly secured within the left end of valve spool 32 as seen in the drawing, having a restricted orifice 40 therein for permitting some of the input hydraulic fluid to flow into the first chamber 33, and through another member 43 threadingly secured within the right end of valve spool 32 as seen in the drawings, having a restrictive orifice 44 therein, whereby some flow of the input hydraulic fluid is permitted to flow into chamber 34. The chamber 33 is in turn connected to the outlet port 23 via a passage 41 formed within the housing 19, passage 41 extending parallel to passage 38. Associated with the passage 41 is a radially extending restricted orifice 42, so that the flow of the hydraulic fluid between the chamber 33 and the outlet port 23 is restricted. A spring 45 is disposed within the second chamber 34 so as to normally bias the valve spool 32 toward the left as viewed in the drawing. The biasing force of the spring 45 is selected to be small.

The large diameter bore 21 is provided with an axial plunger 46 which is slidably supported by a transverse annular supporting member 47 and a tubular insulator 48 so that a drain chamber 49 is defined within the large diameter bore 21. An axial nozzle 50, which acts as a variable orifice, is formed within the housing 19 for establishing the fluid communication between the second chamber 34 and the drain chamber 49, the drain chamber 49 having a radial drain port 51 leading to the reservoir 11. A flapper valve 52 is formed integrally with the plunger 46 for movement relative to the nozzle 50. The plunger 46 having the flapper valve 52 thereon is normally biased toward the left as viewed in the drawing by means of a leaf spring 53, the flapper valve 52 thus being biased in a normal and inoperative position in which the nozzle 50 is closed. The leaf spring 53 is inserted between the flapper valve 52 and the plunger 46 and extends between radially spaced pins 54 and 55, as shown in the drawing, the pins 54 and 55 being fixed to the housing 19.

A solenoid 56 is disposed between the housing 19 and the insulator 48, and is electrically connected to a conventional brake control system, not shown, such as for example, the electric circuit disclosed in U.S. Pat. No. 3,245,727 and, therefore, the solenoid 56 is supplied with a control current in proportion to the strength of the signal representing a substantial skid condition of the wheels. The solenoid 56 is thus adapted to attract the plunger 46 so that the flapper valve 52 is moved away from the nozzle 50 in proportion to the current being supplied thereto.

In the configuration shown in the drawing, when the nozzle 50 is in a full open position the respective hydraulic fluid flow resistance $R40$, $R42$, $R44$ and $R50$ of the orifices 40, 42, 44 and 50 are selected as follows:

$$R42/R40 + R42 = R50/R44 + R50$$

For purposes of exposition, the fluid pressure conveyed to the first chamber 33 through the passage 38 having associated therewith the orifice 40 is designated as $P1$ and the fluid pressure receiving area of the valve spool 32 to which the fluid pressure $P1$ is applied is designated as $A1$. It will thus be apparent that a force $P1 \cdot A1$ tends to move the valve spool 32 toward the right as viewed in the drawing. On the other hand, if the fluid pressure within the second chamber 34 beyond the orifice 44 is designated as $P2$ and the fluid pressure receiving area of the valve spool 32 to which the fluid pressure $P2$ is applied is designated as $A2$, a force $P2 \cdot A2$ plus the force of the spring 45 will urge the valve spool 32 toward the left as viewed in the drawing. This force of the spring 45 may be ignored since it is substantially less than the force $P2 \cdot A2$. In addition, as will be clear from the drawing, the areas $A1$ and $A2$ are equal to each other in the embodiment of the present invention.

From the principles mentioned heretofore, the fluid pressure $P1$ within the first chamber 33 may be expressed by the following equation:

$$P1 = (R42/R40 + R42)(P3 - P4) + P4 \qquad (1)$$

wherein $P3$ is the fluid pressure within the inlet port 22 and $P4$ is the fluid pressure within the outlet port 23. Similarly the fluid pressure $P2$ within the second chamber 34 may be expressed by the following equation:

$$P2 = (R50/R44 + R50)(P3) \qquad (2)$$

In this equation, it should be noted that flow resistance $R50$ is varied in proportion to the movement of the flapper valve 52 and more particularly, the flow resistance $R50$ of the nozzle 50 becomes infinite upon closing the nozzle 50.

In operation, if no electric control current is applied to the solenoid 56 so that the flapper valve 52 closes the nozzle 50, and then the control valve means 26 is actuated, the fluid pressure $P3$ conveyed to the inlet port 22 is transmitted to the outlet port 23 through the grooves 35 and 37. In this condition, since the fluid communication between the chambers 34 and 49 is interrupted so that the flow resistance $R50$ of the nozzle 50 will be infinite, the fluid pressure $P2$ in the chamber 34 will attain a maximum pressure which is equal to the fluid pressure $P3$ of the inlet port 22 as will be clear from equation (2) above. At this time the spool valve 32 must be balanced by the fluid pressure $P1$ and the fluid pressure $P2$. Therefore, it will readily be apparent that the fluid pressure $P4$ in the outlet port 23 must be equal to the fluid pressure $P3$ in the inlet port 22 from equation (1) above. In other words, the fluid communication between the inlet and outlet ports 22 and 23 must be maximized and the fluid communication between the outlet and drain ports 23 and 24 must be interrupted. Thus the valve spool 32 is urged toward its extreme left position as shown in the drawing.

If however, the control electric current is applied to the solenoid 56, the flapper valve 52 moves away from the nozzle 50 so as to allow some flow of the hydraulic fluid within the chamber 34 to pass through the nozzle 50 to the drain chamber 49. In proportion to the movement of the flapper valve 52 the flow resistance R50 of the nozzle 50 will be decreased and, hence, the fluid pressure P2 within the chamber 34 will become lower than the fluid pressure P3 within the inlet port 22 as will be clear from equation (2) above. Thus the force urging the valve spool 32 toward the left is reduced and, therefore, the valve spool 32 is moved toward the right. The rightward movement of the valve spool 32 causes the fluid communication between the grooves 35 and 37 to be reduced and causes the fluid communication between the grooves 36 and 37 to be increased. This results in a lowering of the fluid pressure within the outlet port 23. Under these conditions, when the fluid pressure P4 within the outlet port 23 is lower than the fluid pressure P3 within the inlet port 22, the inlet hydraulic fluid is transmitted to the outlet port 23 through the passage 38, the orifice 40, the chamber 33, the orifice 42 and the passage 41. Therefore, even when the fluid communication between the inlet and outlet ports 22 and 23 is interrupted, the inlet hydraulic fluid is nevertheless transmitted to the outlet port 23 by means of the orifices 40 and 42 and, hence, is transmitted to the groove 36 through the fluid communication between the grooves 36 and 37 which is controlled in response to the slidable movement of the valve spool 32. Hence, the fluid pressure within the outlet port 23 does not decrease rapidly thereby preventing fluctuation of the fluid pressure within the outlet port 23, and therefore, it is not necessary to underlap the corresponding lands of the valve spool 32 and the housing 19.

The size of the opening of the nozzle 50 is determined in proportion to the amount of the current applied to the solenoid 56 and the flow resistance of the nozzle 50 is consequently reduced in proportion to the size of the opening thereof. Thus the fluid pressure within the second chamber 34 is lowered as the current increases, as will be clear from equation (2) above, and, hence, the fluid pressure within the outlet port 23 is lowered as the current increases. Assuming for example, that the nozzle 50 is in its full open position since the current applied to the solenoid 56 increases, the flow resistance relationship will be $$R42/R40 + R42 = R50/R44 + R50$$

and the valve spool 32 is moved so as to be balanced by the respective fluid pressures within the first and second chambers 33 and 34. Under these conditions, in order to equalize the fluid pressures within the first and second chambers 33 and 34, the fluid pressure within the outlet port 23 must become zero, as will be apparent from equations (1) and (2) above, and thus the valve spool 32 is moved toward the right as viewed in the drawing so that the fluid communication between the inlet port 22 and the outlet port 23 will be reduced and the fluid communication between the outlet port 23 and the drain port 24 will be maximized.

Obviously many modifications and variations of the present invention are possible in light of the above teachings. It is to be understood, therefore that within the scope of the appended claims, the invention may be practiced otherwise than as specifically described herein.

What is claimed as new and desired to be secured by Letters Patent of the United States is:

1. In a fluid pressure control system for a vehicle including pressure control valve means disposed between a source of fluid pressure and fluid pressure actuating means, said control valve means comprising:

a housing having a bore therein and a single inlet port, a single outlet port and a single drain port, all directly opening into said bore;

a valve spool slidably mounted within said bore of said housing for controlling fluid communication between said inlet and outlet ports and between said outlet and drain ports, said valve spool defining first and second chambers within said housing;

a first passage means within said housing for supplying said fluid pressure conveyed to said inlet port to said first chamber so as to urge said valve spool in one direction;

a first orifice provided within said first passage means;

a second passage means within said housing leading from said first chamber to said outlet port and having a second orifice therein;

a third passage means within said housing for supplying said fluid pressure conveyed to said inlet port to said second chamber so as to urge said valve spool in another direction;

a third orifice disposed within said third passage means;

a second bore in said housing having a drain port;

a flapper valve means disposed in said second bore of said housing adapted to be actuated by an output signal responsive to a vehicle operation condition; and a nozzle in said housing leading from said second chamber being directly open into said second bore and cooperating with said flapper valve means so as to act as a variable orifice to thereby drain said fluid pressure within said second chamber to said second bore.

2. In a fluid pressure control system for a vehicle including pressure control valve means disposed between a source of fluid pressure and fluid pressure actuating means, said control valve means comprising:

a housing having associated therewith an inlet port, an outlet port and a drain port;

a valve spool slidably mounted within said housing for controlling fluid communication between said inlet and outlet ports and between said outlet and drain ports, said valve spool defining first and second chambers within said housing;

a first passage means for supplying said fluid pressure conveyed to said inlet port to said first chamber so as to urge said valve spool in one direction;

a first orifice provided within said first passage means;

a second passage means leading from said first chamber to said outlet port and having a second orifice therein;

a third passage means for supplying said fluid pressure conveyed to said inlet port to said second chamber so as to urge said valve spool in another direction;

a third orifice disposed within said third passage means;

a flapper valve means adapted to be actuated by an output signal responsive to a vehicle operation condition; and a nozzle cooperating with said flapper valve means so as to act as a variable orifice to thereby drain said fluid pressure within said second chamber, wherein said valve spool comprises a first annular groove hydraulically connected to said inlet port and a second annular groove hydraulically connected to said drain port, and said housing comprises another annular groove hydraulically connected to said outlet port cooperating with said first and second grooves of said valve spool depending upon the sliding movement of said valve spool.

3. The system as set forth in claim 2, wherein said first and third passage means are respectively provided within said valve spool and said first and third orifices are respectively formed within orifice members which are respectively provided within said valve spool.

4. The system as set forth in claim 2, wherein said second passage means is formed within said housing.

5. The system as set forth in claim 1, wherein said flapper valve means is moved in proportion to said output signal whereby the size of the opening of said nozzle is determined in proportion to said output signal.

* * * * *